US011250110B2

(12) United States Patent
Garreau et al.

(10) Patent No.: US 11,250,110 B2
(45) Date of Patent: Feb. 15, 2022

(54) METHOD TO SECURE A SOFTWARE CODE

(71) Applicants: THALES DIS FRANCE SA, Meudon (FR); SFNT Germany GmbH, Munich (DE)

(72) Inventors: Eric Garreau, Meudon (FR); Sébastien Volpe, Meudon (FR); Peter Garba, Munich (DE)

(73) Assignees: THALES DIS FRANCE SAS, Meudon (FR); THALES DIS CPL Deutschland GmbH, Munich (DE)

( * ) Notice: Subject to any disclaimer, the term of this patent is extended or adjusted under 35 U.S.C. 154(b) by 265 days.

(21) Appl. No.: 16/481,377

(22) PCT Filed: Jan. 25, 2018

(86) PCT No.: PCT/EP2018/051866
§ 371 (c)(1),
(2) Date: Jul. 26, 2019

(87) PCT Pub. No.: WO2018/138212
PCT Pub. Date: Aug. 2, 2018

(65) Prior Publication Data
US 2020/0004934 A1 Jan. 2, 2020

(30) Foreign Application Priority Data
Jan. 26, 2017 (EP) .................... 17153409

(51) Int. Cl.
*G06F 21/12* (2013.01)
*G06F 21/14* (2013.01)
(52) U.S. Cl.
CPC ............ *G06F 21/125* (2013.01); *G06F 21/14* (2013.01); *G06F 2221/0724* (2013.01)
(58) Field of Classification Search
CPC . G06F 21/125; G06F 21/14; G06F 2221/0724
See application file for complete search history.

(56) References Cited

U.S. PATENT DOCUMENTS 10,467,390 B1 * 11/2019 Wehrli .................. G06F 21/14
2008/0215860 A1 * 9/2008 Jacob ..................... G06F 21/14
712/226

(Continued)

FOREIGN PATENT DOCUMENTS

EP 2098938 A1 9/2009
EP 2937803 A1 10/2015
EP 3035228 A1 6/2016

OTHER PUBLICATIONS

Anonymous: "12.2 Detecting Modification :: Chapter 12. Anti-Tampering :: C/C++ Secure Programming :: Programming :: eTutorials.org",, Feb. 18, 2013, XP0553557401, http://etutorials.org Retrieved from the Internet: URL:http://web.archive.org/Programming/secure+programming/Chapter+12.+Anti-Tampering/12.2+Detecting+Modification/ [retrieved on Mar. 22, 2017] the whole document.

(Continued)

*Primary Examiner* — David J Pearson
(74) *Attorney, Agent, or Firm* — The Jansson Firm; Pehr B. Jansson

(57) ABSTRACT

The present invention relates to a method of securing a compiled software code (SC) comprising computer code instructions organized in a plurality of basic blocks, said method generating a secure software code (SSC) and comprising the steps of: •determining (S1) by a processor a portion of the software code to be protected, •inserting (S2) by the processor in a selected basic block of the software code a first sequence of instructions which when executed at runtime: computes an integrity check value on said portion of the software code to be protected and computes an index value based on said computed integrity check value, •inserting (S3) by the processor in the selected basic block of the software code an indexed array of memory addresses in which the address, when executing the secure software code, of a following basic block to be executed after the selected (Continued)

basic block is indexed by said index value, •inserting (S4) by the processor at the end of the selected basic block of the software code a jump instruction to the address indexed in the array by said index value computed at runtime.

10 Claims, 3 Drawing Sheets

(56) References Cited

U.S. PATENT DOCUMENTS

| | | | |
|---|---|---|---|
| 2010/0115287 | A1 | 5/2010 | Betouin et al. |
| 2013/0036473 | A1 | 2/2013 | Myles et al. |
| 2013/0232578 | A1 | 9/2013 | Chevallier-Mames et al. |
| 2013/0347109 | A1 | 12/2013 | Fluhrer |
| 2015/0310193 | A1* | 10/2015 | Hoogerbrugge ........ G06F 21/14 726/26 |
| 2016/0117155 | A1* | 4/2016 | Salmon-Legagneur ..................... G06F 21/125 717/156 |
| 2016/0171246 | A1* | 6/2016 | Hoogerbrugge ........ G06F 21/54 726/26 |

OTHER PUBLICATIONS

PCT/EP2018/051866, Feb. 22, 2018, International Search Report, European Patent Office, P.B. 5818 Patentlaan 2 NL—2280 HV Rijswijk.

PCT/EP2018/051866, Feb. 22, 2018, Written Opinion of the International Searching Authority, European Patent Office, D-80298 Munich, GERMANY.

PCT/EP2018/051865, Mar. 7, 2018, International Search Report, European Patent Office, P.B. 5818 Patentlaan 2 NL—2280 HV Rijswijk.

PCT/EP2018/051865, Mar. 7, 2018, Written Opinion of the International Searching Authority, European Patent Office, D-80298 Munich, Germany.

* cited by examiner

METHOD TO SECURE A SOFTWARE CODE

FIELD OF THE INVENTION

The present invention relates to the field of software protection, and more particularly of anti-tampering techniques. It discloses an anti-tampering method based on integrity checks and resistant to compiled code static analysis.

BACKGROUND OF THE INVENTION

Today, many services are provided to users by running software applications. Such applications may run on various devices, mobile or not, such as desktop computers, laptops, point of sale terminals, smartphones, etc. They may run locally or be implemented across a network like a LAN or the Internet. Some devices such as smart cards or bank credit cards may even be dedicated to running one or a few applications. Such applications are usually run in unsecured environments where an attacker may gain some control, or even full control, of the operation of the system running the application. Consequently, most of these applications need to implement some security mechanisms in order to protect data handled by the application from being read or modified by such an attacker.

An attacker may try to understand the operation of a software by reverse-engineering the compiled code executed by the system. He may then access secure information handled by the software and/or modify the software in order to perform malicious operations. For example an attacker could modify a banking software in order to perform malicious financial transactions or modify a license-protected software in order to run it for free without purchasing a license. Such a reverse-engineering is usually performed using tools, such as code analyzers and debuggers, that extract from a compiled code information about the operations of the code, such as a control flow graph describing the order of execution of instructions in the code.

In order to prevent any modification of a software code, anti-tampering techniques have been developed. They often rely on performing an integrity check on some part of the code, for example by calculating a checksum value over a specific region of the software code, and then comparing the obtained value with a known reference value. If values do not match, the code has been tampered with and the execution of the software should be prevented, either by refusing normal execution of the software or by faking it. Nevertheless, such protections can also be reversed-engineered by an attacker and broken. It is particularly easy for a debugger or code analyzer to spot the initialization of a variable to a constant value and the usage of such a constant value in a comparison performed by an anti-tampering process. This kind of information could be used by an attacker in order to identify the kind of protection being implemented in the code, which would then enable breaking the protection. For example, an attacker may identify the start and end of the region of the software on which the integrity check is performed, deduce the checksum value calculated on this region by the integrity check routine when the code is unmodified, and then patch the integrity check routine in order to always provide the valid checksum value regardless of any other modification of the software code, even in the region of the software on which the checksum value is calculated.

As a result, there is a need for a method performing an integrity check on some part of a software code, making it difficult for an attacker to understand how such a method works by a static analysis of the protected code, and preventing such an attacker from successfully modifying the protected software code.

SUMMARY OF THE INVENTION

For this purpose and according to a first aspect, this invention therefore relates to a method of securing a compiled software code comprising computer code instructions organized in a plurality of basic blocks, said method generating a secure software code and comprising the steps of:
  determining by a processor a portion of the software code to be protected,
  inserting by the processor in a selected basic block of the software code a first sequence of instructions which, when executed at runtime, computes an integrity check value on said portion of the software code to be protected and computes an index value based on said computed integrity check value,
  inserting by the processor in the selected basic block of the software code an indexed array of memory addresses in which the address, when executing the secure software code, of a following basic block to be executed after the selected basic block is indexed by said index value,
  inserting by the processor at the end of the selected basic block of the software code a jump instruction to the address indexed in the array by said index value computed at runtime.

It enables to protect the software code against tampering by an attacker by disrupting the execution of the secure software code if the portion of the software code to be protected has been tampered with, while hiding the target of the jump instruction among other candidate target addresses in the indexed array.

In an embodiment, the portion of the software code to be protected is determined at random. It enables to protect a large majority of the code by applying the method multiple times without having to select manually one by one all portions of the code to be protected.

In an embodiment, the integrity check value is computed on said portion of the software code to be protected and on at least a part of the selected basic block. It prevents an attacker from inserting an execution break point in the portion of the selected basic block on which the integrity check is computed. Such a stop point could enable him to gain knowledge of the value outputted by the integrity check or the value of the index of the following basic block to be executed.

In an embodiment, the first sequence of instructions comprises a second sequence of instructions which, when executed at runtime, computes said integrity check value by performing one or more operations among a checksum, a mask, a hash function, a binary shifting and arithmetic operations.

In an embodiment, said second sequence of instructions is selected at random in a set of predetermined sequences of instructions computing integrity check functions.

It makes it harder for an attacker to understand how the integrity check value is computed at runtime. It makes it impossible for the attacker to predict, without further analysis of the code, the integrity function to use in order to compute the integrity check value, from which the index in the array of the correct following basic block will be computed.

In an embodiment, the first sequence of instructions comprises a third sequence of instructions which, when executed at runtime, applies a transformation function to said computed integrity check value to compute said index value, said transformation function comprising one or more operations among a checksum, a mask, a hash function, a binary shifting and arithmetic operations.

The transformation function may be selected at random in a set of predetermined transformation functions.

It makes it harder for an attacker to understand how the index of the correct following basic block is retrieved at runtime. It makes it impossible for the attacker to predict, without further analysis of the code, the transformation function to use in order to compute from said integrity check value the index in the array of the correct following basic block.

Addresses in the array may be addresses of basic blocks of the secure software code when the secure software code is executed.

It makes it even more difficult for an attacker to distinguish in the array the address of the following basic block among all other addresses also pointing to basic blocks of the secure software code.

Said integrity check value may be computed on instructions of the secure software code between a start address and a stop address and the method according to the first aspect may comprise:
a fifth securing step performed when or after compiling and linking the secure software code and comprising:
determining begin and end addresses in the software code of the beginning and end of a portion of the software code on which the integrity check value is to be computed,
computing said integrity check value and said index value based on said computed integrity check value,
and a sixth securing step performed when or after compiling and linking the secure software code and comprising:
setting said start and stop addresses to said begin and end addresses determined in the fifth securing step,
setting in the array the address of the following basic block at said index value computed in the fifth securing step.

In an embodiment, the array and the first sequence of instructions are inserted at a random location in the selected basic block of the software code. It makes the secure software code even more confusing for a potential attacker.

The first sequence of instructions may be inserted at the end of the selected basic block before the inserted jump instruction. The integrity check value and the index value of the following basic block are then computed just before they are needed for retrieving the address of the following basic block for the jump, therefore limiting the time window during which an attacker may retrieve it by a dynamic analysis of the code.

According to a second aspect, this invention relates to a non-transitory machine-readable storage medium encoded with instructions of a secure software code for execution by a processor, wherein:
said secure software code is a modified version of a software code comprising computer code instructions organized in a plurality of basic blocks,
a selected basic block of the secure software code comprises an indexed array of memory addresses comprising the address, when executing the secure software code, of a following basic block to be executed after the selected basic block,
said non-transitory machine-readable storage medium being also encoded with a first sequence of instructions inserted in the selected basic block of the secure software code which when executed at runtime:
computes an integrity check value on a portion of the software code to be protected,
computes an index value indexing in the array the address of the following basic block based on said computed integrity check value,
and the selected basic block of the secure software code also comprising at its end a jump instruction to the address of the array indexed by said index value computed at runtime.

In an embodiment, the integrity check value is computed on the portion of the software code to be protected and on at least a part of the selected basic block.

According to a third aspect, this invention relates to a method of executing by a processor instructions of a selected basic block of a secure software code, wherein:
said secure software code is a modified version of a software code comprising computer code instructions organized in a plurality of basic blocks,
the selected basic block of the secure software code comprises an indexed array of memory addresses comprising the address, when executing the secure software code, of a following basic block to be executed after the selected basic block,
said method comprising the steps of:
computing an integrity check value on a portion of the software code to be protected,
computing an index value indexing in the array the address of the following basic block based on said computed integrity check value,
executing at the end of the selected basic block a jump instruction to the address indexed in the array by said computed index value.

The integrity check value may be computed on the portion of the software code to be protected and on at least a part of the selected basic block.

Such a non-transitory machine-readable storage medium according to the second aspect and method according to the third aspect show the same advantages as the ones of the method according to the first aspect.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

In the description detailed below, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The description detailed below is, therefore, not to be taken in a limiting sense, and the scope of the present invention is defined only by the appended claims, appropriately interpreted, along with the full range of equivalents to which the claims are entitled.

The invention aims at securing a compiled software code SC by including in this software code at least one integrity check on a portion of the software code to be protected, and by inserting in the code a jump instruction to a following instruction of the code, in such a way that the jump instruction target depends on the result of the integrity check. It produces a compiled secure software code SSC such that it would be hard for an attacker analyzing the compiled secure software code with a code analyzer or a debugger to get enough knowledge on the integrity check and the jump instruction target to modify the portion of the software code to be protected without disrupting the execution of the code.

Figure 1:
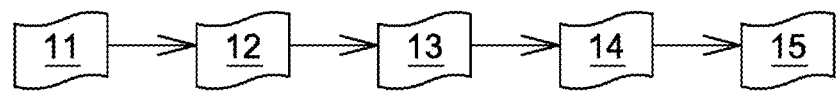
FIG. 1 illustrates the process of compiling software.

Compiling translates a source code 11, written in a high-level programming language such as C or Fortran, into an object code written in a low level language, such as machine code 15 which takes into account the hardware implementation of the system on which the code is supposed to be executed, as depicted in FIG. 1. Compiling often performs intermediate steps such as syntax analysis 12, control flow graph generation 13 and assembly code generation 14. In order to build an executable file of the compiled code, compilation is generally followed by a linking step linking together multiple files containing object code into a single executable file.

Compiled code comprises instructions gathered in basic blocks of instructions. Such basic blocks can be seen as minimal sequences of instructions. A basic block has one entry point at its beginning and one exit point at its end. Whenever the first instruction of a basic block is executed, the rest of the instructions is necessarily executed once in order of appearance of the instructions in the basic block. A basic block may comprise at its end a jump instruction towards the entry point of the next basic bloc to be executed at runtime.

A first aspect of the invention is an anti-tampering method for securing a compiled software code SC before its execution. Such a securing method is performed by a securing device 20 treating the compiled software code SC comprising computer code instructions organized in a plurality of basic blocks, and producing the secure software code SSC.

The obtained secure software code SSC can then be securely executed by an execution device 30.

Figure 2:
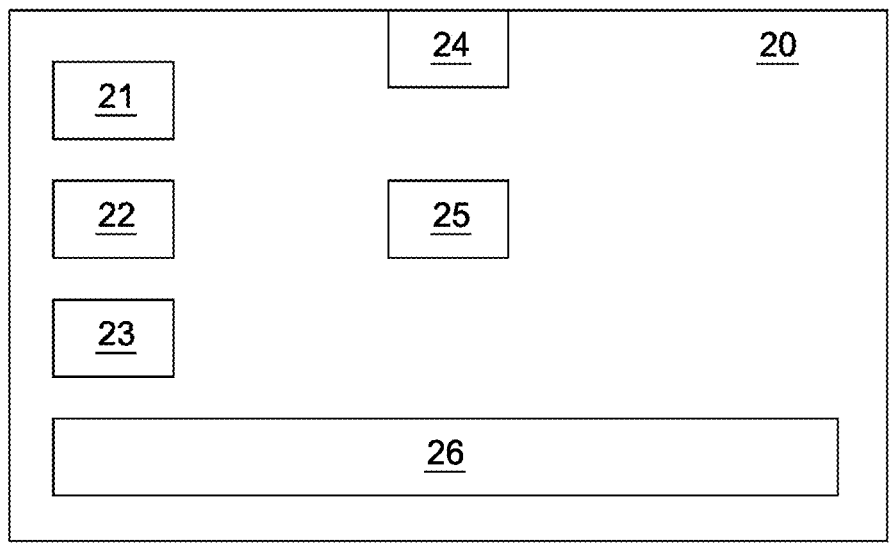
FIG. 2 illustrates schematically a securing device according to an embodiment of the present invention.

Such a securing device 20 may be any electronic device including a processor. For example it may be a personal computer PC on which a development environment was installed. FIG. 2 describes an exemplary embodiment of such a securing device comprising a first processor 21, a first RAM memory 22, a first communication unit 23 such as an Ethernet or Wifi network adapter, a first display 24, first mass storage means 25 such as a hard drive, and first user input means 26. The software code SC to be secured may be stored on the first mass storage means 25 of the securing device. The secure software code SSC, obtained after the securing device 20 applies the method according to the first aspect to the software code SC, can also be stored on the first mass storage 25.

Figure 3:
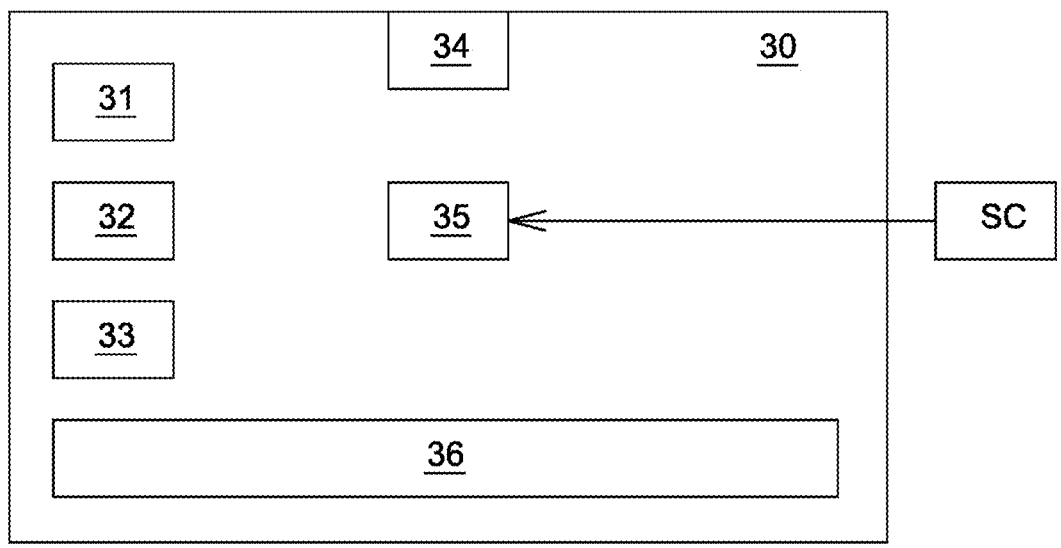
FIG. 3 illustrates schematically an execution device according to an embodiment of the present invention.

FIG. 3 describes an exemplary embodiment of the execution device 30. For example it may be a personal computer PC, a mobile device such as a smartphone or a tablet, or a public terminal in a bank or a point of sale. It may also be a simple chip included in a smart card or a credit card. It may comprise a second processor 31, a second RAM memory 32, a second communication unit 33 such as an Ethernet or Wifi network adapter, a second display 34, second mass storage means 35 such as a hard drive, and second user input means 36. The secure software code SSC, to be executed by the second processor 31 of the execution device 30, may be stored on the second mass storage means 35 of the executing device. The electronic device 30 may be of any type similar or different than the one of the execution device. Both devices may share the same hardware architecture, such as x86, ARM or PowerPC, or have different architectures.

Securing Method Main Steps

Figures 4, 5:
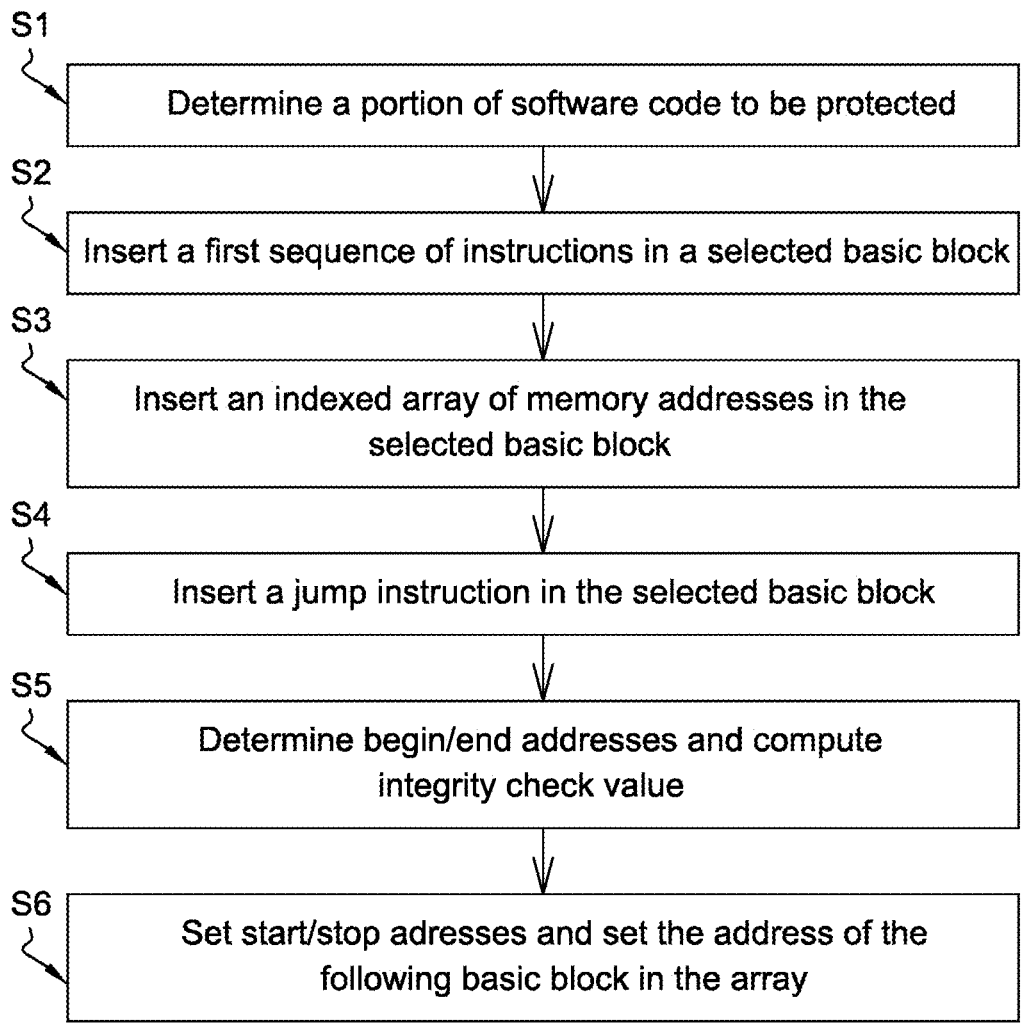
FIG. 4 illustrates schematically a method of securing a compiled software code according to an embodiment of the present invention.
FIG. 5 illustrates an indexed array according to an embodiment of the present invention.

The following paragraphs describe the steps of the method according to the first aspect of the invention, securing the software code SC and producing the secure software code SSC, as depicted on FIG. 4. These securing steps are performed by the first processor 21 of the securing device 20 and are all labeled with the letter "S" followed by the number of the step.

When needed, reference is made to steps performed by the execution device 30 when executing the secure software code SSC, after the method according to the first aspect is completed. Such execution steps are labeled with the letter "E" followed by the number of the step.

Securing Method Main Steps: First Securing Step

In a first securing step S1, a portion of the software code to be protected is determined in the software code SC. This is the portion of code on which an integrity check shall be performed in order to prevent any modification by an attacker. Such a portion of the software code to be protected may be specified to the first processor 21 by a human operator. Alternatively, it can be determined randomly by the first processor 21 itself or computed by a first analysis program run by the first processor 21. Such a portion of the software code may comprise one or more basic blocks of instructions.

In the following steps, the aim is to insert in the software code instructions which when executed perform an integrity check on the determined portion of the software code to be protected, in a way that can resist a static analysis by an attacker. If such an integrity check only consisted in computing a checksum value on the portion of software code to be protected and then comparing it to a reference value, it would be very easy for an attacker to spot such a comparison, to gain knowledge of the reference value and to modify the sequence of instructions verifying the result of the comparison in order to make it always successful, whatever the attacker may have modified in the portion of the software code to be protected.

Instead it is proposed to insert at the end of a basic block of the software code a jump instruction targeting another basic block and whose target is selected on-the-fly, among a list of existing basic blocks of the software code, based on the value calculated by the integrity check. The securing method performed by the securing device 20 is designed in such a way as to insert in the software code instructions which, when executed by the second processor 31 of the execution device 30, make the execution flow of the secure software code jump to the correct next basic block only if the portion of code to be protected has not been modified by an attacker; and make it jump to another, inappropriate, basic block if the portion of code to be protected has been tampered with, therefore leading to an unpredictable behavior of the execution of the code. Such a secure software code makes it very difficult for an attacker to guess the expected checksum value to be obtained when performing the integrity check on the portion of the software code to be protected since the value to be obtained is not stored in the secure software code. It also makes it difficult for an attacker to determine by a static analysis which basic block of the secure software code, among the list of basic blocks, is the correct following block to be executed after the current block ending with the jump instruction. Therefore, an attacker can't bypass the anti-tampering protection by manually forcing the correct following basic block to be executed as the target of the jump independently of the result of the integrity check.

Securing Method Main Steps: Second Securing Step

More precisely, in a second securing step S2, the first processor 21 of the securing device 20 may insert in a selected basic block of the software code a first sequence of instructions. This first sequence of instruction aims at enabling the execution device 30, when executing the instructions of the selected basic block of the secure software code, to retrieve the address of the proper following basic block to be executed right after the selected basic block.

Figure 6:
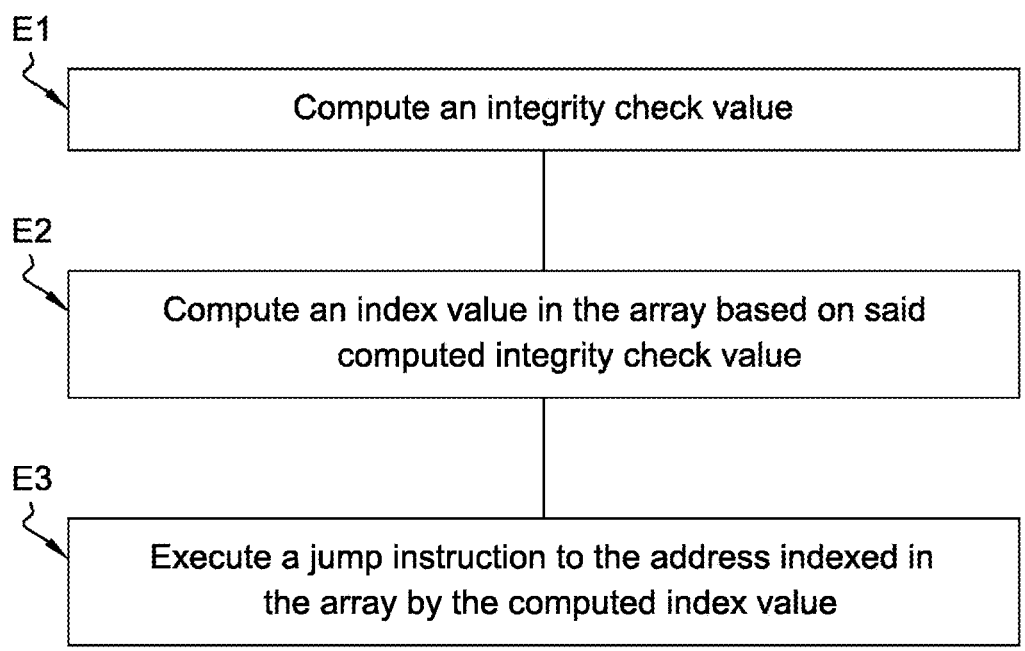
FIG. 6 illustrates schematically a method of executing instructions of a selected basic block of a secure software code according to an embodiment of the present invention.

This first sequence of instructions is such that when the secure software code SSC comprising this first sequence of instructions is executed by the second processor 31 of the execution device 30, the actions described in execution steps E1, E2 and E3 are performed, these execution steps being described hereafter and in FIG. 6.

Such a selected basic block may be specified to the first processor 21 by a human operator. Alternatively, it can be determined randomly by the first processor 21 itself or determined by a second analysis program run by the first processor 21 in order to minimize the calculation time when executing the secure software code SSC.

The first sequence of instructions, when executed by the execution device 30 at SSC runtime:
- computes an integrity check value on said portion of the software code to be protected,
- computes an index value based on said computed integrity check value.

Securing Method Main Steps: Third Securing Step

In a third securing step S3, the first processor 21 of the securing device 20 may insert in the selected basic block of the software code an indexed array of memory addresses, described in FIG. 5, in which the address, when executing the secure software code, of the actual following basic block to be executed after the selected basic block is indexed by said index value computed by the first sequence of instructions.

The first sequence of instruction and the indexed array are designed in such a way that the index value computed by the first sequence of instructions is equal to the index value of the array indexing the address of the following basic block only if the portion of the software code to be protected has not been tampered with.

Using an array is a non-limiting embodiment and any other data structure enabling an indexed storage of values, i.e. a matching between index values and corresponding stored values, such as a table or a matrix could be used instead of using an array.

Securing Method Main Steps: Fourth Securing Step

In a fourth securing step S4, the first processor 21 of the securing device 20 inserts at the end of the selected basic block of the software code a jump instruction to the address of the array indexed by said index value computed at runtime.

Securing Method Exemplary Embodiment

The following paragraphs describe an exemplary and non-limiting embodiment of the securing method according to the first aspect of the invention performed by the securing device 20.

As described before, in the first securing step S1, the portion of the software code to be protected is determined in the software code SC.

Then in the second securing step S2, the first sequence of instruction is inserted in the selected basic block. As described here above, this first sequence of instruction includes instructions which when executed at runtime compute an integrity check value. The first sequence of instructions may comprise a second sequence of instructions which, when executed at runtime, computes said integrity check value by performing one or more operations among a checksum, a mask, a hash function, a binary shifting and arithmetic operations. This integrity check value may be computed on the instructions of the software code between a start address and a stop address of the secure software code. Such start and stop addresses are designed to define a portion of the software code at least including the portion of the software code to be protected determined in the first securing step.

The integrity check value may for example be a checksum or a digest computed using MD5 or SHA-1.

In an embodiment, said second sequence of instructions is selected at random in a set of predetermined sequences of instructions computing integrity check functions. As a result, the way such an integrity check is performed is diversified. It may also be obfuscated, preventing an attacker from easily identifying it in the secure software code and from computing himself the same integrity check value between the start and stop addresses.

In an alternative embodiment, the integrity check value is computed on said portion of the software code to be protected and also on at least a part of the selected basic block. The integrity check may be computed on the part of the selected basic block comprising the first sequence of instructions, and/or the indexed array, and/or the jump instruction at the end of the block. It prevents the attacker from modifying such parts of the selected basic block in order to disable the protection of the software code. The integrity check value may also be computed on the instructions located right before the jump instructions. Doing so prevents an attacker from inserting an execution break point before the jump, which would enable him to get knowledge of the value outputted by the integrity check, and then of the address of the following basic block to be executed after the selected basic block.

The first sequence of instructions also includes instructions computing an index value based on the computed integrity check value.

In order to so, the first sequence of instructions may comprise a third sequence of instructions which, when executed at runtime, applies a transformation function to said computed integrity check value to compute said index value. The transformation function may for example be a checksum or a hash of the integrity check value, or a mask selecting only a few predetermined bits of the integrity check value in order to output an index value. It may also include a binary shifting of the bits of the integrity check value or performing arithmetic operations on the integrity check value.

The transformation function may be selected at random by the first processor of the securing device in a set of predetermined transformation functions.

Then an indexed array is inserted in the selected basic block, as part of the third securing step S3.

The index values of the array may be selected such that all index values of the array are included in the target set of the transformation function. By doing so, all index values in the array can be the result of the application of the transformation function.

The purpose of the indexed array is to store the address of the actual following basic block, to be executed after the selected basic block, at a particular index, such that when the execution device executes the first sequence on instructions of the selected basic block, it computes (step E2 described here under) an index value equal to the index of the address of the following basic block in the array, if the portion of the software code to be protected has not been tampered with.

However, when the indexed array is inserted in the selected basic block by the securing device performing the third securing step S3, the integrity check value that will result from the execution of the first sequence of instruction, and the index value computed based on said integrity check value, are still unknown.

Consequently at this step of the method, the first processor of the securing device may insert in the selected basic block an indexed array comprising the address of the following basic block at a predetermined index in the array, for example at the first position of the array.

Then in the fourth securing step S4, the first processor of the securing device inserts at the end of the selected basic block a jump instruction to the address indexed in the array by the index value resulting from the execution of the first sequence of instruction.

If the selected basic block last instruction was already a jump instruction, this preexisting jump instruction may be deleted and the jump instruction inserted at the end of the selected basic block at the fourth securing step S4 replaces it.

At this step of the process, the index value that will be obtained when executing the first sequence of instructions is unknown and may, most probably, not be the index in the array of the address of the following basic block. It will more probably be the index in the array of the address of another basic block. Executing the software code resulting from this step of the process would then make the execution flow jump to a basic block which is not supposed to be executed right after the selected basic block in a normal execution control flow, leading to an unpredictable behavior of the execution.

In order to fix this issue, the method may comprise a fifth securing step S5, performed when or after compiling and linking the secure software code, during which the first processor 21 of the securing device 20 performs an analysis of the software code after it has been assembled in order to become an executable, allowing to analyze this software code in a state which is very close to the final secure software code. The fifth securing step S5 may comprise:
- determining actual begin and end addresses in the software code of the beginning and end of the portion of the software code on which the integrity check value is to be computed, including at least the portion of the software code to be protected,
- computing the integrity check value, as it would be computed by the first sequence of instructions inserted in the selected basic block,
- computing the index value by applying the transformation function to the integrity check value, as it would be computed by the first sequence of instructions inserted in the selected basic block.

In such a step, the integrity check value shall be computed according to the second sequence of instructions, particularly when this second sequence of instructions has been selected at random in a set of predetermined sequences of instructions. Similarly, the index value shall be computed by applying the selected transformation function when the transformation function has been selected at random in a set of predetermined transformation functions.

The method may also comprise a sixth securing step S6, performed when or after compiling and linking the secure software code, during which the first processor 21 of the securing device 20 performs the final modification to the software code in order to deliver the secure software code.

The sixth securing step S6 may comprise:
- setting the start and stop addresses defining the portion of the software code on which the integrity check value is computed to the begin and end addresses determined in the fifth securing step S5. Such addresses will be used for computing the integrity check value during the first execution step E1.
- setting the address of the actual following basic block in the array at the index value computed in the fifth securing step S5. It is the same index value that will be computed during execution step E2.

The array may comprise at its other indexes many other addresses of basic blocks of the secure software code when it is executed. Such addresses may be addresses of potential following basic blocks, randomly selected among other basic blocks of the secure software code. In such a case, during the sixth securing step S6, when setting the address of the actual following basic block at the index value computed in the fifth securing step, the address of the actual following basic block may be swapped in the array with the address of another basic block already indexed in the array by the index value computed in the fifth securing step.

By doing so, an attacker can't determine that an address of the array can't be the address of the following basic block (which would be possible if such an address was not the address of a basic block or if the associated index in the array was not a possible result of the transformation function). If an attacker performs a static analysis on the secure software code, he will only be able to spot the jump instruction at the end of the selected basic block and he will not be able to determine which address among the plurality of addresses stored in the array shall be designated as the target of the jump in order to keep the secure software code executing correctly.

In an embodiment, the array and the first sequence of instructions may be inserted at a random location in the selected basic block of the software code, before the inserted jump instruction. Alternatively, they may be inserted at the end of the selected basic block before the inserted jump instruction. The first sequence of instructions may be interlaced with existing instructions of the selected basic block, in such a way that it does not interfere with such existing instructions.

Secure Software Code Execution

After the steps described here above have been performed by the securing device, producing a secure software code, such a secure software code can be securely executed by the second processor 31 of the execution device 30. When executing the selected basic block, the execution device executes the first sequence of instructions:

- during a first execution step E1, the second processor 31 computes an integrity check value at least on said portion of the software code to be protected.
- during a second execution step E2, the second processor 21 computes an index value based on said computed integrity check value.

If the portion of the software code to be protected has not been tampered with:

- the computed integrity check value is such that the computed index value is the index in the array of the address of the correct following basic block to be executed right after the execution of the selected basic block;
- and the jump instruction at the end of the selected basic block makes the execution flow jump to the beginning of this correct following basic block.

Otherwise, if the portion of the software code to be protected has been tampered with:

- the computed integrity check value is such that the computed index value is the index in the array of an address most probably different than the address of the correct following basic block to be executed right after the execution of the selected basic block;
- and the jump instruction at the end of the selected basic block makes the execution flow jump at this address, leading to an unpredictable behavior of the execution.

Multiple Application of the Method According to the First Aspect

The method according to the first aspect of the invention may be applied multiple times to protect several portions of the software code, possibly overlapping with each other. In that case, during the first securing step S1, the portions of the code to be protected for every applications of the method may be determined by the first analysis program such that all the software code or all sensitive portions of the software code are protected. If the transformation function is chosen each time randomly among a set of predetermined transformation functions, a different transformation function may be chosen for each portion of the software code to be protected.

Other Aspects

In a second aspect, the invention also relates to a non-transitory machine-readable storage medium encoded with the instructions of the secure software code obtained after the first processor 21 of the securing device 20 has performed at least the steps S1 to S4 of the method according to the first aspect described here above. Said secure software code is then a modified version of the unsecure software code on which said method according to the first aspect has been applied and comprising computer code instructions organized in a plurality of basic blocks. In the instructions encoded on said storage medium, a selected basic block of the secure software code comprises an indexed array of memory addresses comprising the address, when executing the secure software code, of a following basic block to be executed after the selected basic block.

The non-transitory machine-readable storage medium is also encoded with a first sequence of instructions inserted in the selected basic block of the secure software code which, when executed at runtime perform the execution steps E1 to E2 described here above:

- computing an integrity check value on a portion of the software code to be protected,
- computing an index value indexing in the array the address of the following basic block based on said computed integrity check value, the selected basic block of the secure software code also comprising at its end a jump instruction to the address indexed the array by said index value computed at runtime.

In a third aspect, the invention also relates to the method of executing the instructions of the secure software code, as executed by the second processor 31 of the executing device 30. Said secure software code is then a modified version of the unsecure software code comprising computer code instructions organized in a plurality of basic blocks on which the method according to the first aspect described here above has been applied. A selected basic block of said secure software code also comprises an indexed array of memory addresses comprising the address, when executing the secure software code, of a following basic block to be executed after the selected basic block. The method of executing the instruction of the secure software code comprises the execution steps E1 to E2 described here above:

- during the first execution step E1, the second processor 31 computes an integrity check value on a portion of the software code to be protected;
- during the second execution step E2, the second processor 31 computes an index value indexing in the array the address of the following basic block based on said computed integrity check value;

The method comprises a third execution step E3 during which the second processor 31 executes at the end of the selected basic block a jump instruction to the address of the array indexed by said computed index value.

As a result, the proposed methods enable performing an integrity check on a portion of a software code to be protected and protecting this integrity check by a jump interrupting the execution of the secure software code if the protected portion has been tampered with. For more protection, the proposed methods hide in the software code the following basic block to be executed, target of the jump instruction, therefore preventing an attacker from understanding how such methods work by a static analysis of the protected code and from modifying the protected code.

The invention claimed is:

1. A method of securing a compiled software code (SC) comprising computer code instructions organized in a plurality of basic blocks, said method generating a secure software code (SSC) and comprising the steps of:
   - determining (S1) by a processor (21) a portion of the software code to be protected,
   - inserting (S2) by the processor in a selected basic block of the software code a first sequence of instructions which when executed at runtime:
     - computes (E1) an integrity check value on said portion of the software code to be protected,
     - computes (E2) an index value based on said computed integrity check value, inserting (S3) by the processor in the selected basic block of the software code an indexed array of memory addresses in which the address, when executing the secure software code, of a following basic block to be executed after the selected basic block is indexed by said index value, inserting (S4) by the processor at the end of the selected basic block of the software code a jump instruction to the address indexed in the array by said index value computed at runtime, wherein said integrity check value is computed on instructions of the secure software code between a start address and a stop address, and wherein said method further comprises a fifth securing step (S5) performed when or after compiling and linking the secure software code and comprising determining begin and end addresses in the software code of the beginning and end of a portion of the software code on which the integrity check value is to be computed, computing said integrity check value and said index value based on said computed integrity check value, and comprising a sixth securing step (S6) performed when or after compiling and linking the secure software code and comprising:

setting said start and stop addresses to said begin and end addresses determined in the fifth securing step (S5) wherein the start and stop addresses are used during the execution step in the computation of the integrity check value, setting, in the array, the address of the following basic block at said index value computed in the fifth securing step.

2. The method of claim 1 wherein the portion of the software code to be protected is determined at random.

3. The method of claim 1 wherein the integrity check value is computed on said portion of the software code to be protected and on at least a part of the selected basic block.

4. The method of claim 1 wherein the first sequence of instructions comprises a second sequence of instructions which, when executed at runtime, computes said integrity check value by performing one or more operations among a checksum, a mask, a hash function, a binary shifting and arithmetic operations.

5. The method of claim 4 wherein said second sequence of instructions is selected at random in a set of predetermined sequences of instructions computing integrity check functions.

6. The method of claim 1 wherein the first sequence of instructions comprises a third sequence of instructions which, when executed at runtime, applies a transformation function to said computed integrity check value to compute said index value, said transformation function comprising one or more operations among a checksum, a mask, a hash function, a binary shifting and arithmetic operations.

7. The method of claim 6 wherein the transformation function is selected at random in a set of predetermined transformation functions.

8. The method of claim 1 wherein addresses in the array are addresses of basic blocks of the secure software code when the secure software code is executed.

9. The method of claim 1 wherein the array and the first sequence of instructions are inserted at a random location in the selected basic block of the software code.

10. The method of claim 1 wherein the first sequence of instructions is inserted at the end of the selected basic block before the inserted jump instruction.

* * * * *